United States Patent [19]
Schreiner

[11] Patent Number: 5,899,518
[45] Date of Patent: May 4, 1999

[54] DECKING SYSTEM AND DECKING ASSEMBLY METHOD

[75] Inventor: Harry L. Schreiner, 8170 Turnpike Dr., Westminster, Colo. 80030-4324

[73] Assignees: Harry L. Schreiner; Janice Coen, both of Westminster, Colo.

[21] Appl. No.: 08/872,361

[22] Filed: Jun. 10, 1997

Related U.S. Application Data

[60] Provisional application No. 60/019,434, Jun. 10, 1996.

[51] Int. Cl.$^6$ ....................................................... B60R 3/37
[52] U.S. Cl. ........................ 296/26.01; 296/162; 293/106; 108/44
[58] Field of Search ............................... 290/26.01, 26.08, 290/26.12, 162; 293/106; 108/44; 52/79.5, 79.6, 263

[56] References Cited

U.S. PATENT DOCUMENTS

| | | | |
|---|---|---|---|
| 3,094,848 | 6/1963 | Albrecht | 52/263 |
| 3,515,406 | 6/1970 | Endsley, Jr. | 296/162 |
| 3,875,712 | 4/1975 | Thompson | 52/263 |
| 3,921,350 | 11/1975 | Van Schoyck | 52/263 |
| 4,747,243 | 5/1988 | Anstead | 52/79.6 |
| 4,883,306 | 11/1989 | Stucky | 296/162 |
| 4,901,895 | 2/1990 | Gancarz | 293/106 |
| 5,040,467 | 8/1991 | King | 108/44 |

*Primary Examiner*—Dennis H. Pedder
*Attorney, Agent, or Firm*—Brian D. Smith, P.C.

[57] ABSTRACT

Decking systems for recreational vehicles are disclosed as well as methods of assembling the decking systems. One of the disclosed system provides a rectangular deck which contains a plurality of elongated side-by-side disposed boards. The deck has an inner edge for attachment to the exterior of a recreational vehicle. The inner edge is formed by a plurality of the ends of the plurality of side-by-side disposed boards. The system also includes an inner edge support for attachment to the exterior of the motor vehicle which receives the plurality of the board ends to support the deck's inner edge. In addition, the system has a frame for maintaining the plurality of boards in side-by-side disposition, and for cooperating with the inner edge support to secure the deck defined by the boards to the recreational vehicle. The deck is also provided with support legs for supporting the deck so that it is generally level, and at an elevated position relative to the surface supporting the motor vehicle. The deck thereby provides an elevated surface which may be used for recreational purposes.

15 Claims, 5 Drawing Sheets

DECKING SYSTEM AND DECKING ASSEMBLY METHOD

CROSS REFERENCE TO RELATED APPLICATIONS

This application is a nonprovisional application claiming the benefit under 35 USC 119(e) of U.S. provisional application Ser. No. 60/019,434, filed on Jun. 10, 1996.

TECHNICAL FIELD OF THE INVENTION

The invention relates generally to outside decks and more particularly to portable and easily assembled decks.

BACKGROUND OF THE INVENTION

The prior art is replete with method and apparatus for assembling decks and various decking systems. Despite the abundance of decking systems and assembly methods therefor, there are presently no known decking systems for attachment to motor vehicles such as the vehicles commonly vehicles referred to as RVs or recreational vehicles. It is anticipated that an easily assembled and portable decking system for use or attachment to a recreational vehicle would be welcomed by many owners of such vehicles who desire a patio-like surface upon which they can place lawn chairs, tables and the like to enjoy the outdoors. Such a system would also provide recreational vehicle users with a surface upon which they can recreate upon without having to worry about tracking mud into the vehicle when it rains.

DISCLOSURE OF THE INVENTION

The present invention addresses the aforementioned need by providing a quickly and easily assembled (and disassembled) decking system for a parked motor vehicle. The decking system includes a deck for attachment to the exterior of a motor vehicle, which includes a plurality of side-by-side disposed boards. This system also includes inner edge support means, which is preferably permanently attached to the exterior of the motor vehicle, for supporting an edge of the deck and facilitating its attachment to the exterior of the motor vehicle. In addition, the decking system preferably includes a frame or means for maintaining the boards in side-by-side disposition relative to each other. Finally, the decking system includes support leg means for supporting the deck so that it is generally level and at an elevated position relative to the surface or ground supporting the vehicle.

In a preferred embodiment, the decking system of the present invention includes a rectangular deck consisting of a plurality of elongated side-by-side disposed boards. The deck has an inner edge for attachment to the exterior of a parked motor vehicle which is formed by a plurality of the ends of the plurality of side-by-side disposed boards. In addition, the rectangular deck has side edges and an outer edge. The system further includes inner edge support means attached to the exterior of the motor vehicle for receiving the plurality of the board's ends to support the deck's inner edge. In addition, frame means are provided for maintaining the plurality of boards in side-by-side disposition relative to each other. The frame means also cooperates with the inner edge support means to secure the deck defined by the boards to the motor vehicle. Finally, the system includes support leg means for supporting the deck so that it is generally level, and at an elevated position relative to a supporting surface, typically the ground supporting the motor vehicle. The deck thereby provides an elevated surface which may be used for recreational purposes.

The method of the present invention provides an extremely easy and quick method of assembling a decking system to a parked motor vehicle. The method includes providing a decking system as described above, and attaching, preferably permanently attaching, the inner edge support means thereof to the exterior of the motor vehicle at an elevated position relative to the surface supporting the vehicle, i.e. the ground. In addition, the method includes attaching side sections of the frame means to the inner edge support means attached to the motor vehicle, as well as attaching the deck support leg means to the frame's side sections.

After attaching the inner edge support means, frame and support legs, each board on the support leg means is positioned so that an end of each board is received in the inner edge support means, and so that the boards are in side-by-side disposition with respect to each other. When all the boards are so positioned, the plurality of boards defines the deck. One then completes the assembly process by attaching an outer edge section of the frame to the frame's side sections which, as will be appreciated, serves to maintain the plurality of boards in side-by-side disposition with respect to each other, thereby insuring that the deck remains in place and secured to the motor vehicle. From the below detailed description of the invention, it will be appreciated that the present invention enables one to easily and promptly assemble the decking system of the present invention without using any fastening means such as nails or bolts on a majority of the boards comprising the deck.

BRIEF DESCRIPTION OF THE DRAWINGS

The invention will be more readily understood by reference to the accompanying drawings wherein like reference numerals indicate like elements throughout the drawing figures, and in which.

BEST MODE FOR CARRYING OUT THE INVENTION

Figure 1:
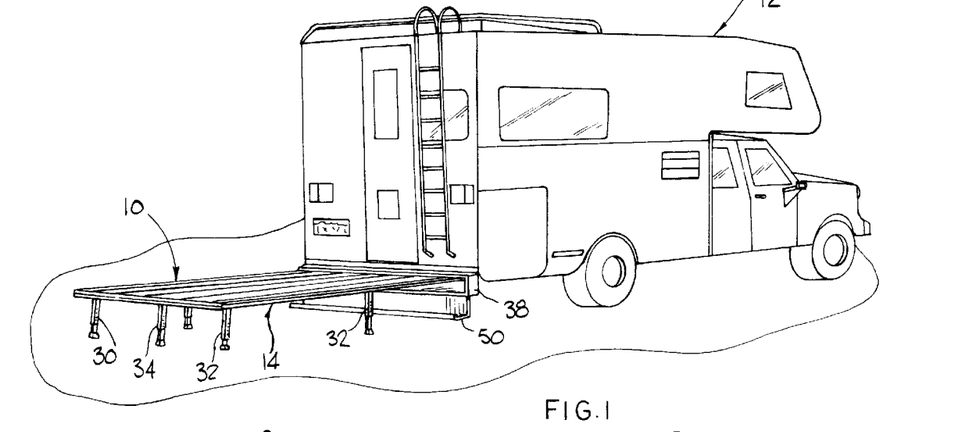
FIG. 1 is a perspective view of a decking system of the present invention attached to the rear of a recreational vehicle.

FIGS. 1 through 7 illustrate a first embodiment of a decking system 10 of the present invention for attachment as shown in FIG. 1 to the rear of a recreational vehicle 12. Decking system 10 generally includes a rectangular deck 14 which is defined by a plurality of side by side disposed boards 16. Deck 14 has an inner edge 18 defined by the ends of the boards which is supported by an inner edge support means, or channel 20. In addition, system 10 includes frame means (not numbered) including side and outer edge sections 22 and 24 for respectively extending around the deck's side and outer edges (not numbered) which as will be appreciated maintain boards 16 in side-by-side disposition relative to each other. Finally, decking system 10 includes support leg means (not numbered) provided by a pair of cross supports 28 to which a pair of left and right leg supports 30 and 32 are attached, as well as a center leg support 34.

Figure 4:
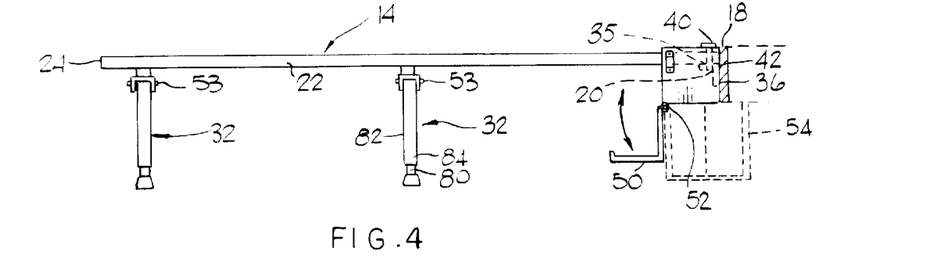
FIG. 4 is a side elevational view of the decking system of FIG. 1.
Figures 6, 8:
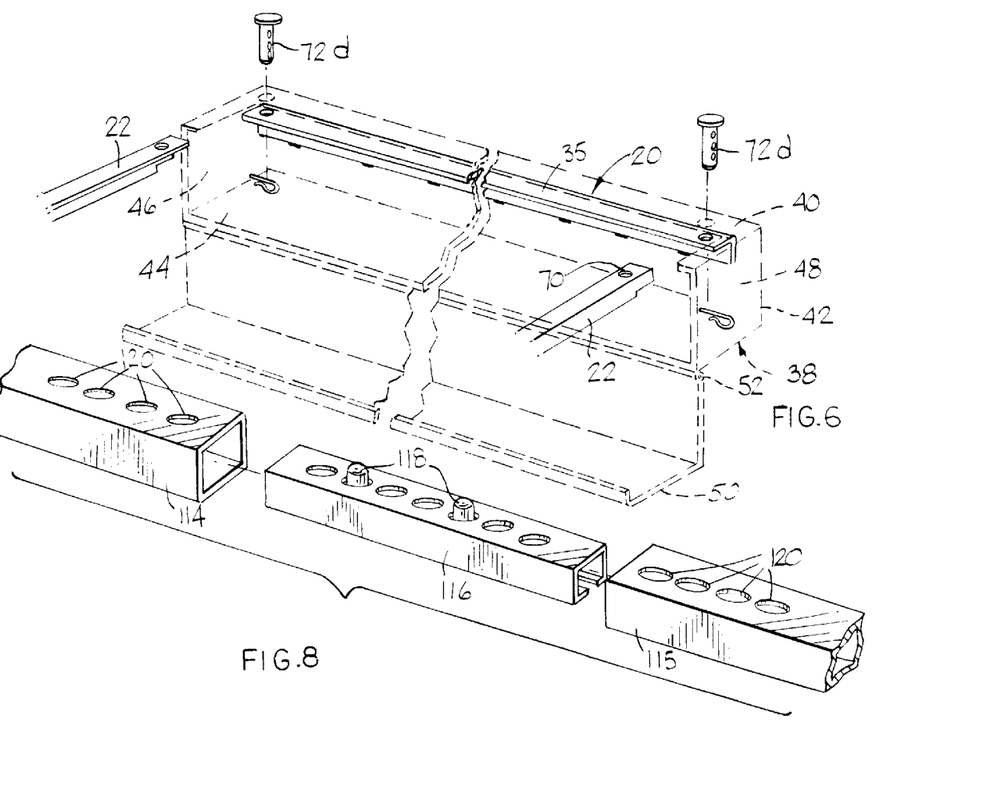
FIG. 6 shows the details of the means for connecting the frame of the decking system of FIG. 1 to the decking system's inner edge support means which additionally shows the storage box of the system in phantom.
FIG. 8 is a perspective view showing the connection member for joining the right and left cross support sections of the decking system illustrated in FIG. 10.
Figure 7:
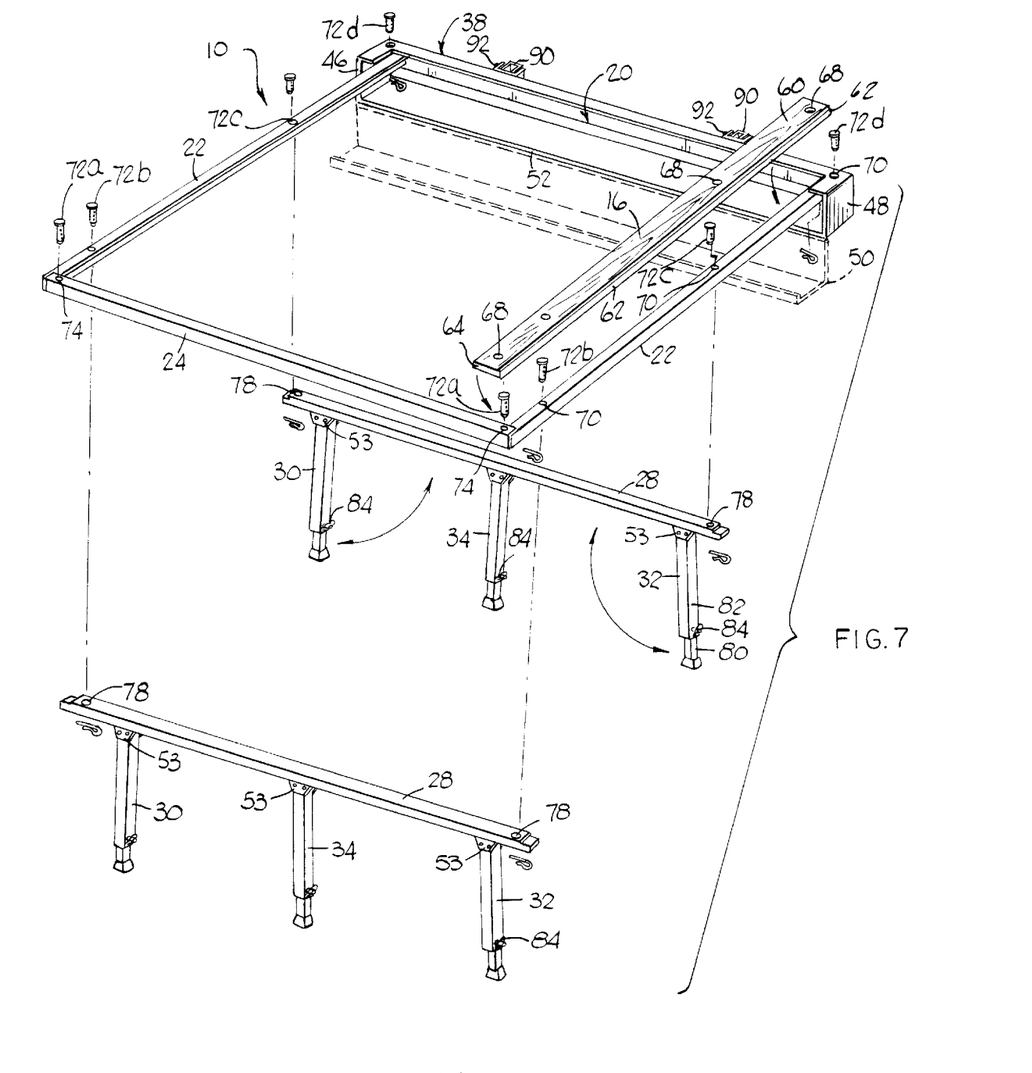
FIG. 7 is a partially exploded view of the frame and the storage box of the decking system of FIG. 1.

As best illustrated in FIGS. 4, 6 and 7, a surface 35 of channel 20 (which supports the ends of boards 16 defining the inner edge 18 of deck 14) is defined by one side of an elongated section of angle iron. The angle iron's other side 36 (see FIG. 4) which extends downwardly as shown is welded to the back of a storage box 38 which has an integral top 40, back 42, bottom 44 and left and right sides 46, 48.

As also shown, channel 20 is further defined by the underside surface (not numbered) of the box's top 40 and the inside surface (not numbered) of back 42 and is sized and configured to snugly receive the end of each board 16 so that the board is prevented from any twisting movement, i.e. rotational movement about its longitudinal axis. Box 38 is also provided with a lid 50 that is pivotally attached to box 38 by a hinge 52.

In accordance with an important aspect of the present invention, box 38 is sized and configured to receive all of the components of decking system 10, except for boards 16 when it is desired to disassemble the decking system and move the recreational vehicle 12.

Figure 5:
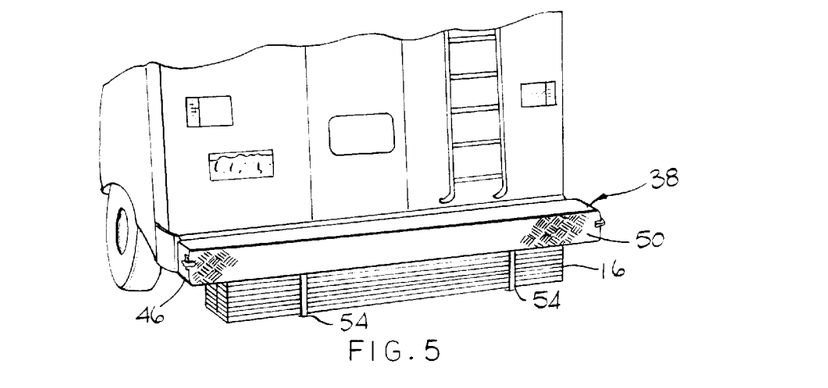
FIG. 5 is a perspective view showing the decking system of FIG. 1 disassembled and stored within the storage box of FIG. 1 with the system's boards secured to the underside of the storage box.

It will also be appreciated that support legs 30–34 are capable of being folded against cross support 28 (to which they are pivotally attached by brackets 53) which enables one to easily store the folded assembly within box 38, along with side sections 32 and outer edge section 24 of the frame means. As shown in FIGS. 4 and 5, boards 16 are preferably stored underneath box 38 by inserting each board 16 into a pair of brackets 54 secured to the bottom of box 38 as best shown in FIGS. 4 and 5.

FIGS. 6 and 7 illustrate that side sections 22 and outer edge section 24 of the deck's frame are generally elongated L-shaped sections of angle iron, the top side (not numbered) of which rests on the top surface 60 of the outermost boards 16. As also shown, the downwardly extending sides (not numbered) of the side sections extend over the sides 62 of the outermost boards 16. Similarly, the downwardly extending side (not numbered) of the outer edge section extends over the exposed ends 64 of each board 16 so as to generally cap the ends. In addition, it will be appreciated that the left and right outer boards 16 are provided with holes 68 that are aligned with a plurality of holes 70 provided in side section 22. The aligned holes receive bolts or pins 72(a–d) which secure the outermost boards 16 and side sections 22 to each other and to the inner support channel 20, as well as box 38. Support channel 20 and box 38 are also provided with holes (not numbered) for receiving pins 72(d). In addition, it will be appreciated that the outermost pin identified as pin 72a extends through a hole 74 provided in the outer edge section 24 of the frame to secure outer edge section 24 to side edge sections 22. When so secured, side sections 22 and outer edge section 24 maintain the side-by-side disposition of boards 16, i.e. they prevent the boards from spreading apart. FIG. 7 also illustrates that pins 72 secure each cross support 28 to side sections 22 through a bore 76 provided in each end of each cross support.

FIG. 7 further illustrates that each support leg 30, 32 and 34 attached to cross supports 28 includes inner and outer sections 80 and 82 which telescope with each other to enable the length of each support leg to be adjusted. As also illustrated, each support leg includes a locking pin 84 for locking the telescoping sections of each support leg in a position providing the desired length for the support leg. By properly adjusting the length of each support leg one can take account of variations in the ground surface to insure that the deck is level.

Figure 2:
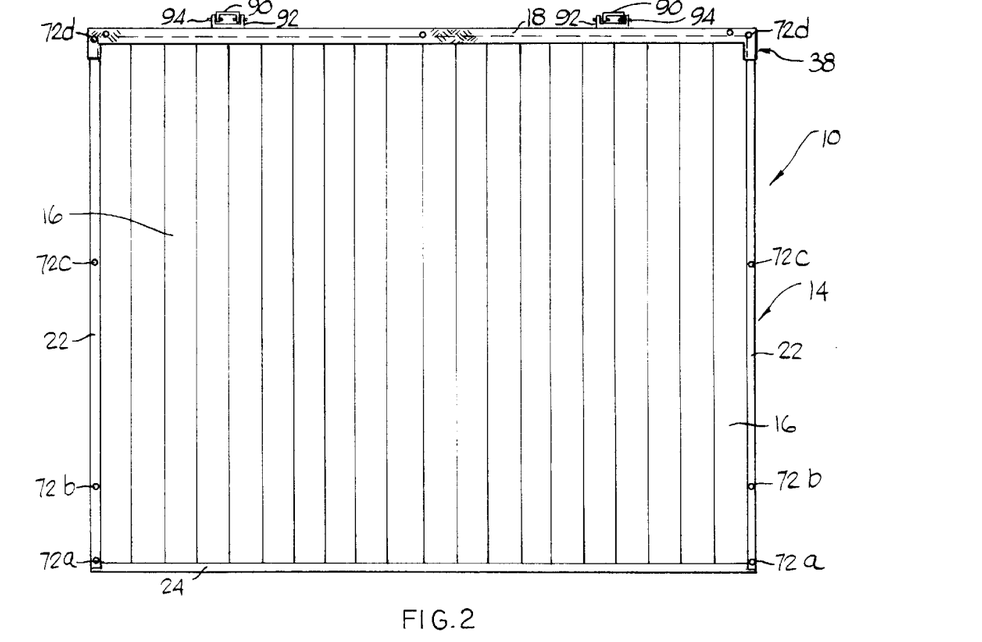
FIG. 2 is a top plan view of the decking system of FIG. 1.

FIGS. 2 and 7 illustrate that box 38 is attached to the exterior of the recreational vehicle by a pair of rigidly attached inner and outer brackets 90, 92. Outer bracket 92 is attached, preferably tack welded, to the outer surface of the back 48 of box 38. Inner bracket 90 is attached to the exterior of the motor vehicle by a bolt fastening means (not shown). The brackets 90 and 92 are rigidly attached to each other by conventional lock pins 94 which when removed enable box 38 to be removed from the vehicle.

To assemble decking system 10, one first attaches inner bracket 90 to the surface of the vehicle so that when box 38 is attached to the vehicle it will be at a desired position above the ground, preferably about 16 inches above ground level. This distance may vary depending on the ground clearance of the particular vehicle to which the system is being attached.

Figure 3:
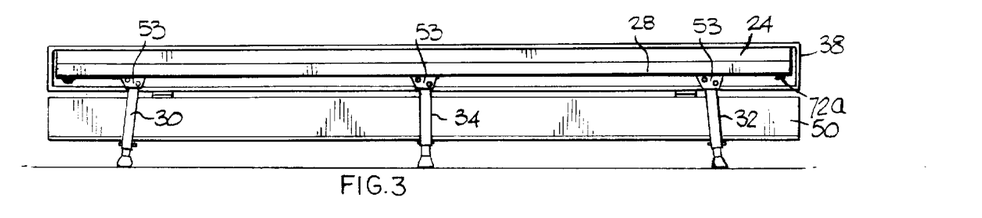
FIG. 3 is an end elevational view of the decking system of FIG. 1.

After attaching, preferably bolting, brackets 90 to the vehicle, box 38 is attached to the vehicle with lock pins 94, as previously described. One then preferably attaches the side edges 22 and outermost boards 16 of the deck by properly positioning the boards and side edges 22 as illustrated in FIG. 1 and inserting pins 72b and 72c through the holes provided for such, as previously described. At this point, cross supports 28 should also be attached to the outermost board 16 and side edges 22 by properly positioning the ends of the cross supports so that they are secured thereto by pins 72b and 72c. One then pivots support legs 30, 32 and 34 so that they are in a generally upright position. As illustrated in FIG. 3, left and right support legs 30, 32 pivot to an angled position which is slightly five degrees over vertical to provide the deck with more lateral support as will be appreciated by those skilled in the relevant art. At this point, it may also be desirable to adjust the length of each support leg so that the frame is generally level. As previously described, the length of the support legs is easily adjusted by telescopingly moving inner section 80 of the leg until the support leg has the desired overall length. The leg can be locked in this position by using pin 84. One then inserts or positions the remainder of the boards on the cross supports so that an end of each board is received in channel 20, and so that the boards are in side-by-side disposition as illustrated in FIG. 2. One then completes the assembly process by attaching the outer edge section 24 to side sections 22 with pin 72a which, as shown in FIG. 2, caps the outer exposed ends of the boards.

It will also be appreciated that when the side and end sections 22, 24 are attached as described, the side-by-side disposition of boards 16 will be maintained, thereby preventing the boards from spreading apart. Those skilled in the art will also appreciate that the above assembly process requires the insertion of no fastening members, i.e. pins or bolts, through any of the boards other than the outermost boards, i.e. the outer right and left boards. As such, the assembly process is not only easy, but can be performed very quickly and with minimum effort. As used herein, boards which have no bores or holes for receiving bolts or other fastening members are referred to herein as solid boards.

Figure 9:
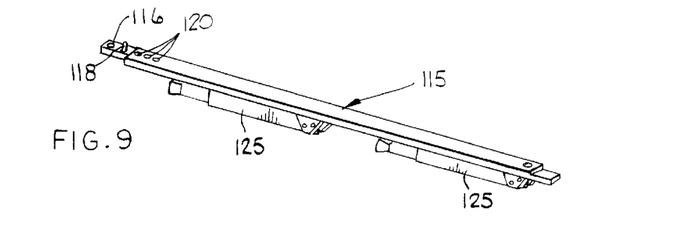
FIG. 9 is a perspective view of the right cross support section of the embodiment of FIG. 10.
Figure 10:
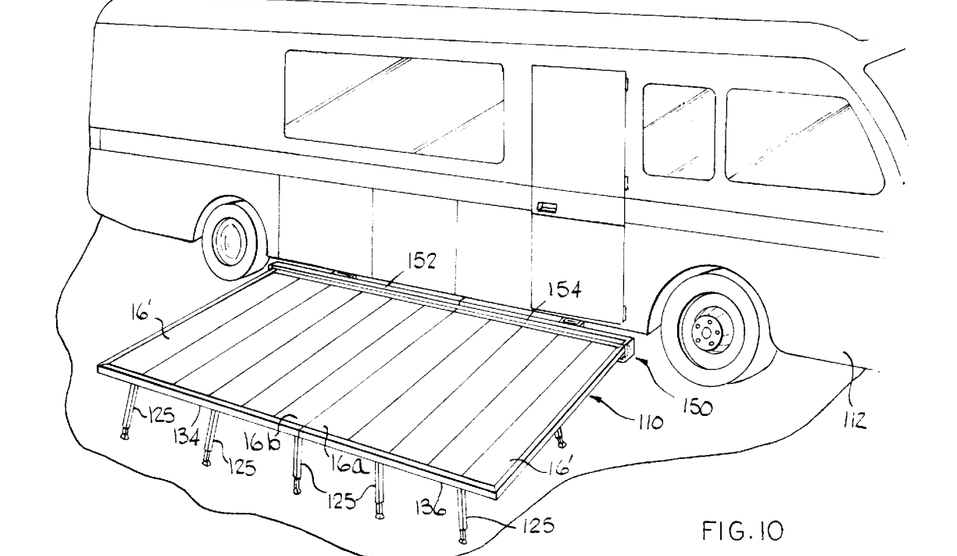
FIG. 10 is a perspective view of another decking system of the present invention which is attached to the side of a recreational vehicle.
Figure 11:
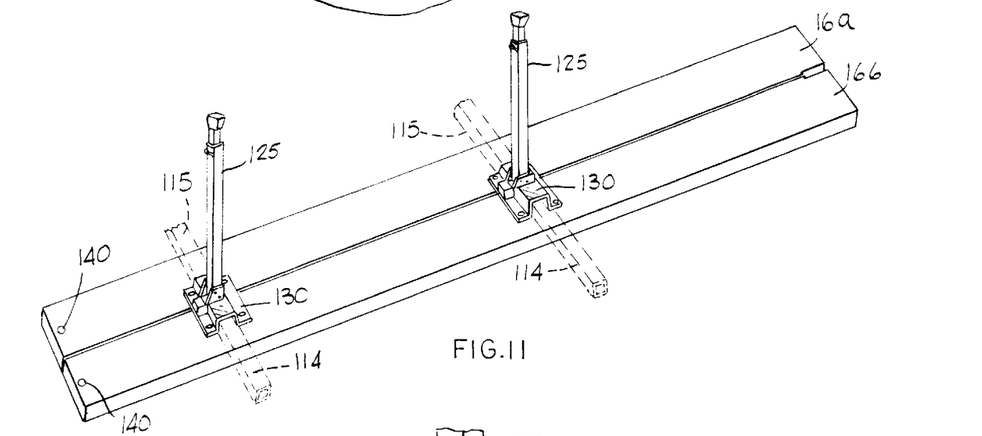
FIG. 11 is a perspective view of the underside of the center boards for the system of FIG. 10 which shows the channel bracket for joining the left and right support leg sections of the system.
Figure 12:
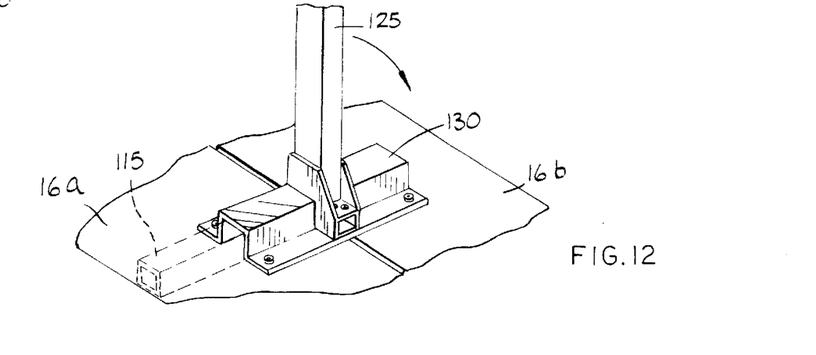
FIG. 12 is an enlarged, partially broken away perspective view of the channel bracket illustrated in FIG. 11.
Figure 13:
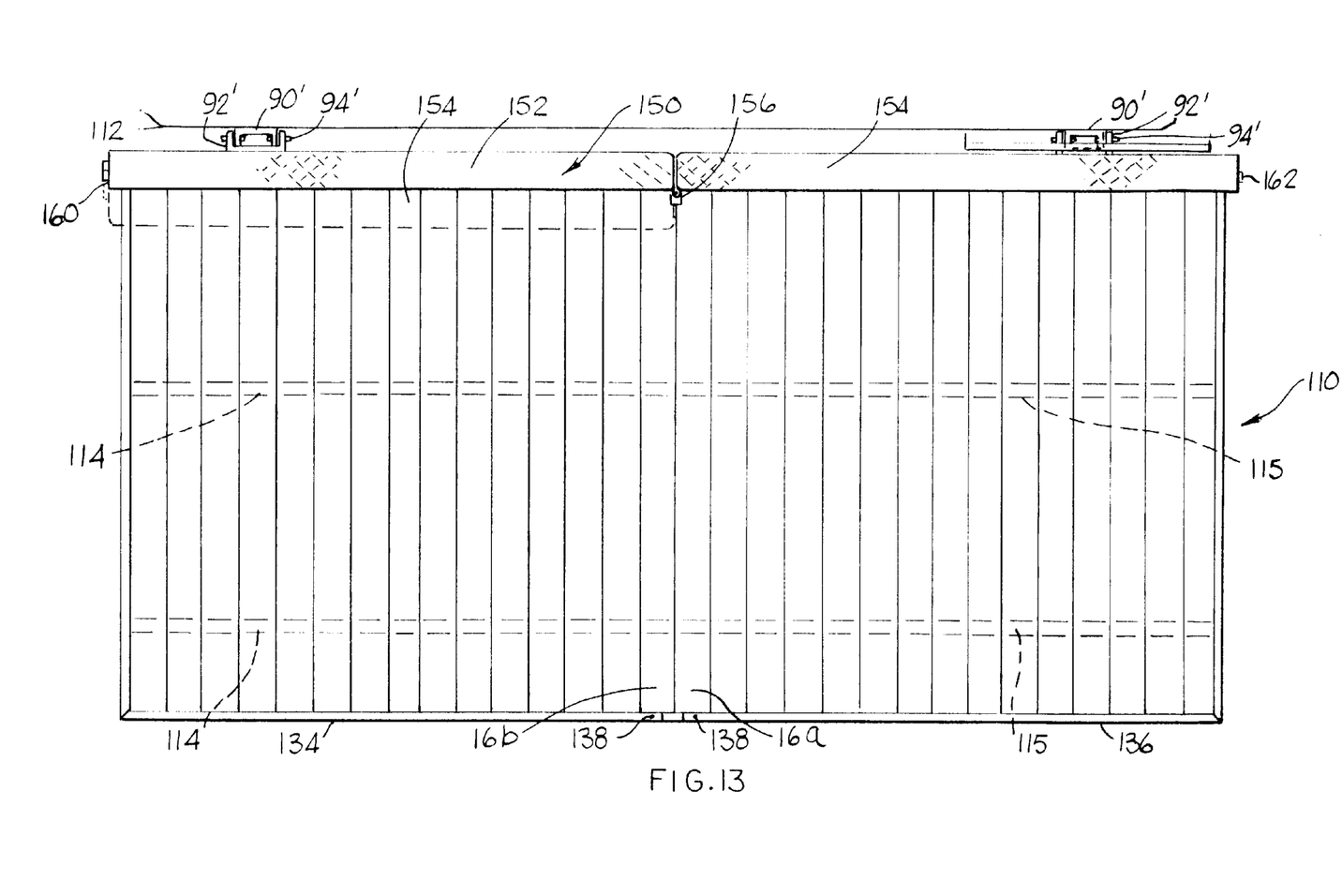
FIG. 13 is a top plan view of the decking system illustrated in FIG. 10.

FIGS. 10 and 13 illustrate another decking system 110 of the present invention. Decking system 110 is similar to decking system 10 of the previous embodiment with the primary exception being that it is significantly wider which enables the system to be attached to the side of a recreational vehicle 112 as opposed to the vehicles's rear end as is the case with decking system 10. The components of decking system 110 which are identical to those of decking system 10 are numbered similarly with the exception that the numbers are primed in decking system 110. The components of system 110 which are different than those of the previous system are illustrated in FIGS. 8 through 13.

One of the major components which is different in system 110 is the cross support system for boards 16'. As shown in FIGS. 8 and 9, instead of a single cross support 28, the cross support system of decking system 110 includes left and right cross support sections 114, 115 which are joined together by a connection member 116. As also shown, connection member 116 is provided with spring loaded pins 118, each of which is sized and configured to be received in one of the holes 120 provided in the ends (not numbered) of cross support sections 114, 115. By providing a plurality of holes 120, one can slightly adjust the overall length of the connected cross support sections 114, 115 so that they are long enough to support the plurality of boards 16'.

FIG. 10 also illustrates that instead of three support legs 30–34 as provided in decking system 10, each cross support assembly of decking system 110 is supported by five support legs 125, which are fundamentally identical to those of decking system 10. As best illustrated in FIG. 9, each cross support section 114, 115 has two support legs 125 pivotally attached to it so that the support leg can be swung to an upright position as illustrated in FIG. 10. The fifth or center cross support leg 125 which is illustrated in FIGS. 11 and 12 is attached to a center channel bracket 130 which, in turn, is attached, preferably screwed, to the underside of a pair of central boards 16a and 16b, as such is illustrated in FIGS. 11 and 12. From FIGS. 11 and 12, one can also visualize that each channel bracket 130 receives a connection member 116 and the ends of cross support sections 114, 115 which connection member 116 connects. Connection member 116 cannot be seen in FIG. 11 because it is telescopingly received within sections 114, 115, the ends of which are also telescopingly received within channel bracket 130.

The outer edge member of system 110 for capping the outer exposed ends of boards' 16 which is similar to outer edge frame member 24 of the previous embodiment also includes left and right sections 134, 136, as such is best shown in FIG. 13. The interfacing ends (not numbered) of the sections 134, 136 are secured by pins 138 (which are similar to pins 72 of the first embodiment) which are inserted into holes 140 provided in the ends of boards 16a and 16b as such is illustrated in FIG. 11.

The only other substantive difference between decking systems 10 and 110 pertain to the storage box means for storing the components of each system. Instead of box 38 which is provided with a lid 50, box 150 of decking system 110 is provided with two half sections 152 and 154. As best illustrated in FIG. 13, box section 154 is pivotally attached to box section 152 by a hinge means 156.

As will be appreciated, when section 154 is pivoted from its closed position shown in phantom in FIG. 13 to its open position shown in solid line in FIG. 13, one can easily store all components of decking system 110 (except for boards 16') in box 150. Box sections 152, 154 are also provided with latch members 160, 162 which enable one to latch the box sections together when it is desired to close the storage box.

As will also be appreciated, when it is desired to assemble decking system 110, one simply pivots storage box section 154 to the open position shown in FIG. 13. One then secures the back of box section 154 to the vehicle with bracket members 90' and 92' which are connected by inserting pins 94' in bores (not shown) as previously described with respect to elements 90 through 94 of decking system 10. The remaining process for assembling decking system 110 is similar to that previously described for system 10.

As will be appreciated, the present invention provides a recreational vehicle user with a decking system which is easily assembled and attached to the side or the rear end of a recreational vehicle. The system is quite wide and is also capable of extending under the side or rear door of a recreational vehicle, as shown in the illustrated embodiments. This enables recreational vehicle users to walk directly from the interior of the vehicle onto the deck without having to step first onto the ground. Such a deck should appeal to most recreational vehicle users who do not want to step on the ground which can be quite muddy if it is raining or has rained recently.

This invention has been described in detail with reference to particular embodiments thereof, but it will be understood that various other modifications can be effected within the spirit and scope of this invention.

What is claimed is:

1. A decking system for a parked motor vehicle comprising:

a rectangular deck including a plurality of elongated side by side disposed boards, said deck having an inner edge for attachment to the exterior of a parked motor vehicle wherein said inner edge is formed by a plurality of the ends of said plurality of side by side disposed boards, said deck also having side edges and an outer edge;

inner edge support means for attachment to the exterior of the motor vehicle and for receiving said plurality of said boards' ends to support said deck's inner edge;

frame means for maintaining said plurality of boards in side by side disposition relative to each other and for cooperating with said inner edge support means to secure said deck defined by said boards to the motor vehicle; and deck support leg means for supporting said deck so that it is generally level and at an elevated position relative to the surface supporting the motor vehicle, said deck thereby providing an elevated surface which may be used for recreational purposes, said inner edge support means further including storage box means for storing said frame means and said deck support leg means when said decking system is disassembled.

2. A decking system as claimed in claim 1 wherein said storage box means includes a lid which is opened to allow access to said storage box means so that said frame means and said deck support leg means can be removed from and said box means.

3. A decking system as claimed in claim 1 wherein said storage box means includes an elongated generally rectangular box having at least an integral back and top and wherein said inner edge support means is an elongated channel sized and configured to receive the ends of the boards, and wherein said elongated channel is defined by the top and back of said box and a support surface opposing said top which is secured to said back of said box and wherein said top and support surface are spaced from each other a distance approximating the thickness of the boards so that said boards are capable of being slidably received in said channel and supported thereby.

4. A decking system as claimed in claim 3 wherein said support surface is provided by one side of an elongated section of angle iron, the other side of which is welded to the back of the box.

5. A decking system as claimed in claim 3 wherein said frame means includes side and outer edge capping for respectively extending around said side and outer edges of said deck and for attachment to said inner edge support means to maintain said plurality of boards in side by side disposition relative to each other and to laterally secure said deck's inner edge so that it remains received and supported by said inner edge support means.

6. A decking system as claimed in claim 5 wherein said deck support leg means includes a plurality of elongated cross supports for extending along the underside of said side by side disposed boards to support said boards, each said cross support having two oppositely facing ends which are attached to said side edge capping to laterally stabilize said deck, each said cross support also being provided with support legs for supporting said deck so that it is generally level and at an elevated position relative to the surface supporting the motor vehicle, said deck thereby providing an elevated surface which may be used for recreational purposes.

7. A decking system as claimed in claim 5 wherein each said support leg includes telescoping sections which telescope relative to each other so that the length of said support leg can be adjusted, each said support leg also including locking pin means for locking said telescoping sections in a desired position providing a desired length for said support leg, the length of which facilitates support of said deck in a desired level position.

8. A decking system as claimed in claim 5 wherein each cross support includes left and right outer telescoping sections which are joined together by an inner telescoping connection member, all of which cooperate to enable the overall length of said cross support to be adjusted.

9. A decking system as claimed in claim 6 further comprising bracket means attached to at least one of said boards for laterally stabilizing said cross supports.

10. A decking system as claimed in claim 7 wherein said bracket means includes a channel bracket attached to at least one of said boards for slidably receiving a said cross support to laterally stabilize the said cross support.

11. A decking system as claimed in claim 10 wherein said deck support leg means includes a support leg attached to said channel bracket.

12. A method of assembling a decking system for a parked motor vehicle comprising:
providing a parked motor vehicle;
providing a decking system for the parked motor vehicle including:
a plurality of elongated boards;
inner edge support means for attachment to the exterior of the motor vehicle and for receiving and supporting a plurality of the boards' ends when it is attached to the motor vehicle;
frame means having side and outer edge sections which cooperate to maintain the plurality of boards in side by side disposition relative to each other so that they define a deck, the side and outer edge sections also cooperating with the inner edge support means to secure the deck defined by the boards to the motor vehicle; and
deck support leg means for supporting the deck so that it is generally level and at an elevated position relative to the surface supporting the motor vehicle, said deck thereby providing an elevated surface which may be used for recreational purposes, said inner edge support means further including a storage box for storing the frame means and the deck support leg means when said decking system is disassembled;
removing the frame means and the deck support leg means from the storage box;
attaching the inner edge support means to the exterior of the motor vehicle at an elevated position relative to the surface supporting the motor vehicle;
attaching the side sections of the frame means to the inner edge support means attached to the motor vehicle;
attaching the deck support leg means to the side sections of the frame means;
individually positioning each board on the deck leg support means so that an end of each board is received in the inner edge support means and so that the boards are in side by side disposition with respect to each other to define the deck; and
attaching the outer edge section of the frame means to the side sections of the frame means to maintain the plurality of boards in side by side disposition with respect to each other and to secure the deck to the motor vehicle.

13. A method as claimed in claim 12 wherein a majority of said boards are maintained in side by side disposition relative to each other by said frame means without using fastening means that penetrate said boards of said majority.

14. A decking system for a parked motor vehicle comprising:
a deck for attachment to the exterior of a parked motor vehicle, said deck including a plurality of elongated side by side disposed boards;
storage box means including inner edge support means for attachment to the exterior of the motor vehicle to support an edge of said deck and for facilitating said deck's attachment to the exterior of the motor vehicle, said storage box means also for storing components of said decking system when it is disassembled;
frame means including edge sections for capping the edges of said deck which are defined by the ends of said plurality of side by side disposed boards to maintain said boards in side by side disposition relative to each other; and
deck support leg means for supporting said deck so that it is generally level and at an elevated position relative to the surface supporting the motor vehicle, said deck thereby providing an elevated surface which may be used for recreational purposes.

15. A motor vehicle decking system comprising:

a motor vehicle;

a deck for attachment to the exterior of a motor vehicle, said deck including a plurality of side by side disposed boards;

storage box means including inner edge support means attached to the exterior of the motor vehicle for supporting an edge of said deck and facilitating its attachment to the exterior of the motor vehicle, said storage box means also for storing components of said decking system when it is disassembled;

means for maintaining said boards in side by side disposition relative to each other; and support leg means for supporting said deck so that it is generally level and at an elevated position relative to the surface supporting the motor vehicle, said deck thereby providing an elevated surface which may be used for recreational purposes.

* * * * *